Figure 9:
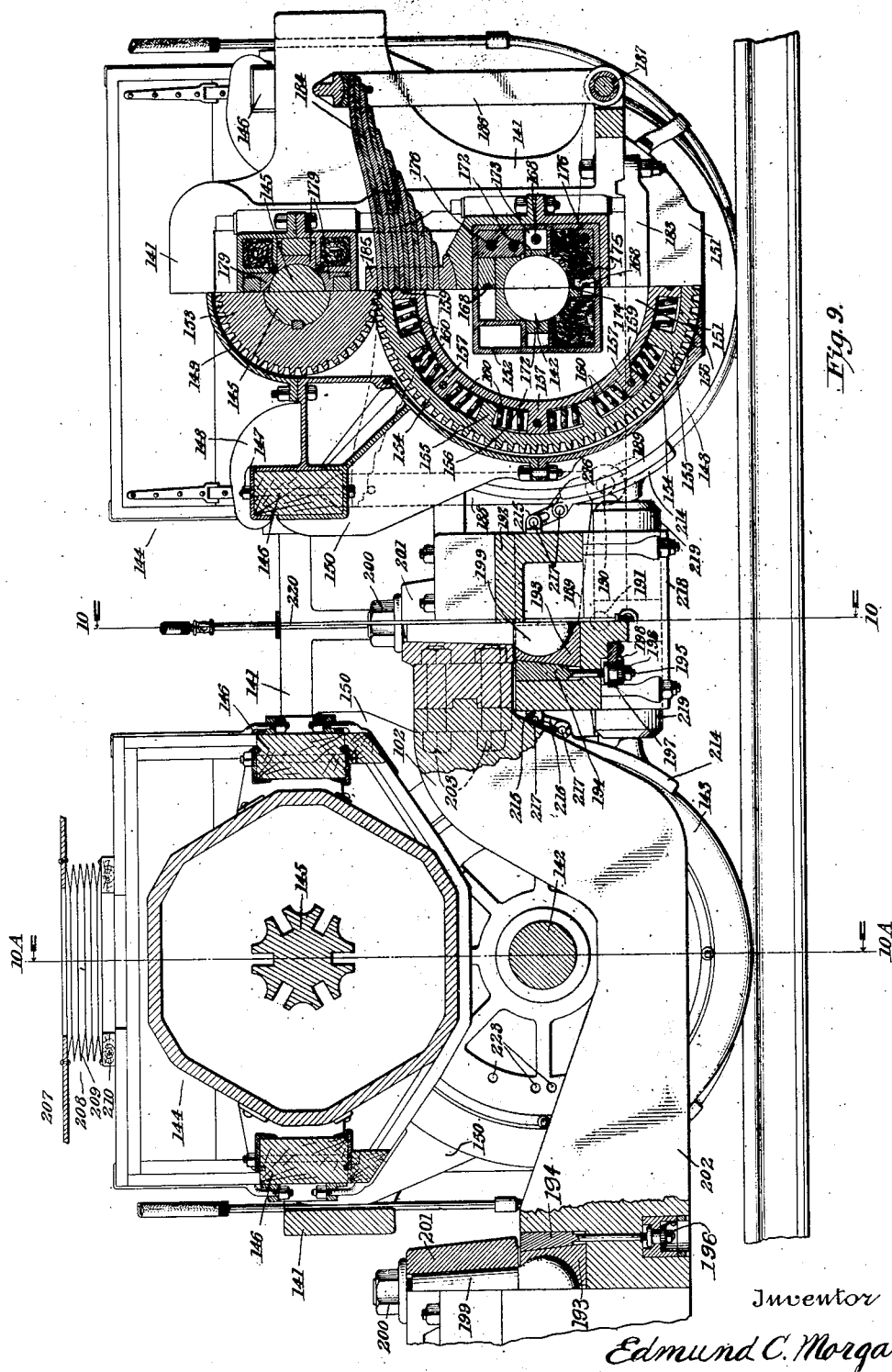

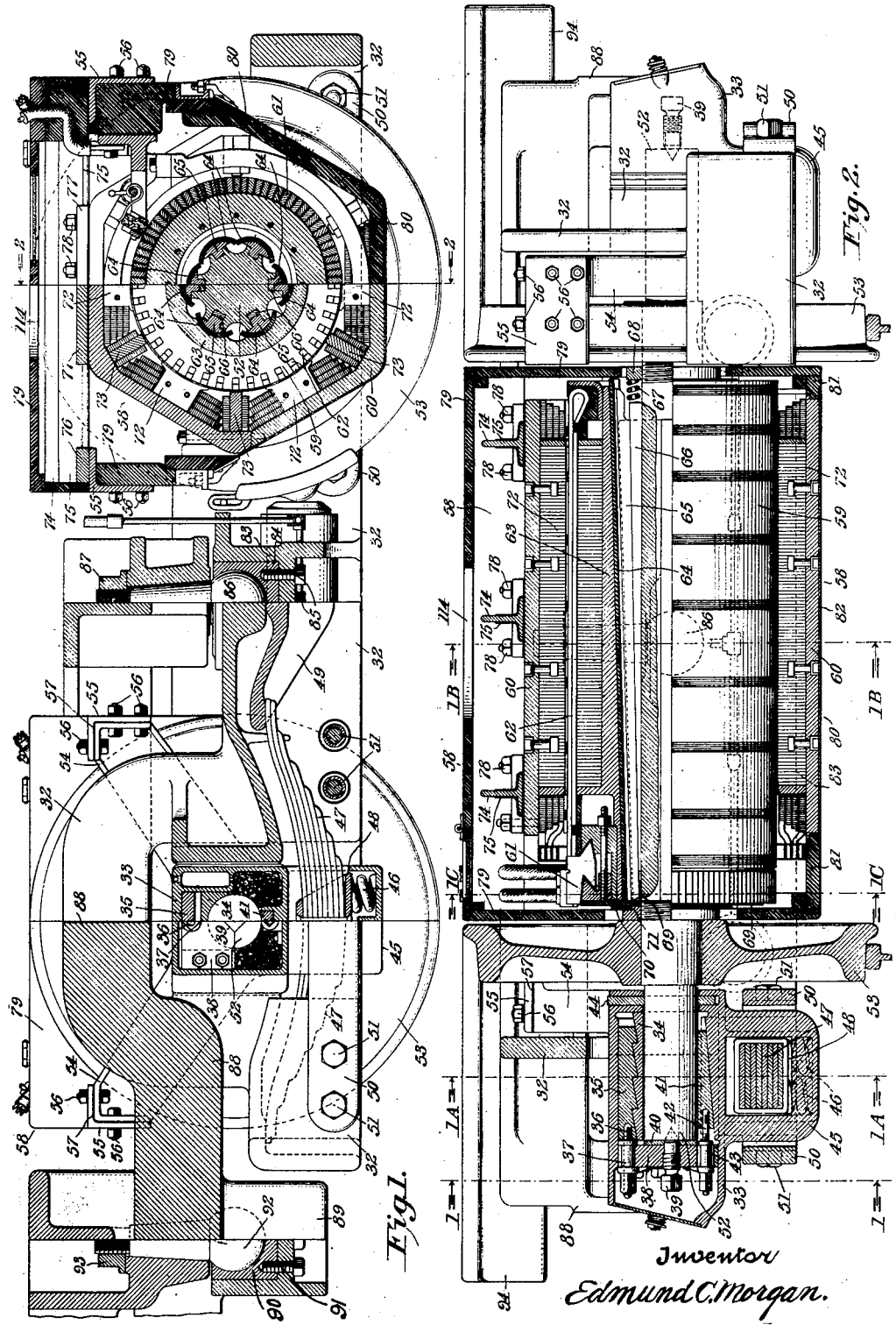

Aug. 10, 1926.  
E. C. MORGAN  
1,595,114  
ELECTRIC LOCOMOTIVE  
Filed March 21, 1922 10 Sheets-Sheet 2
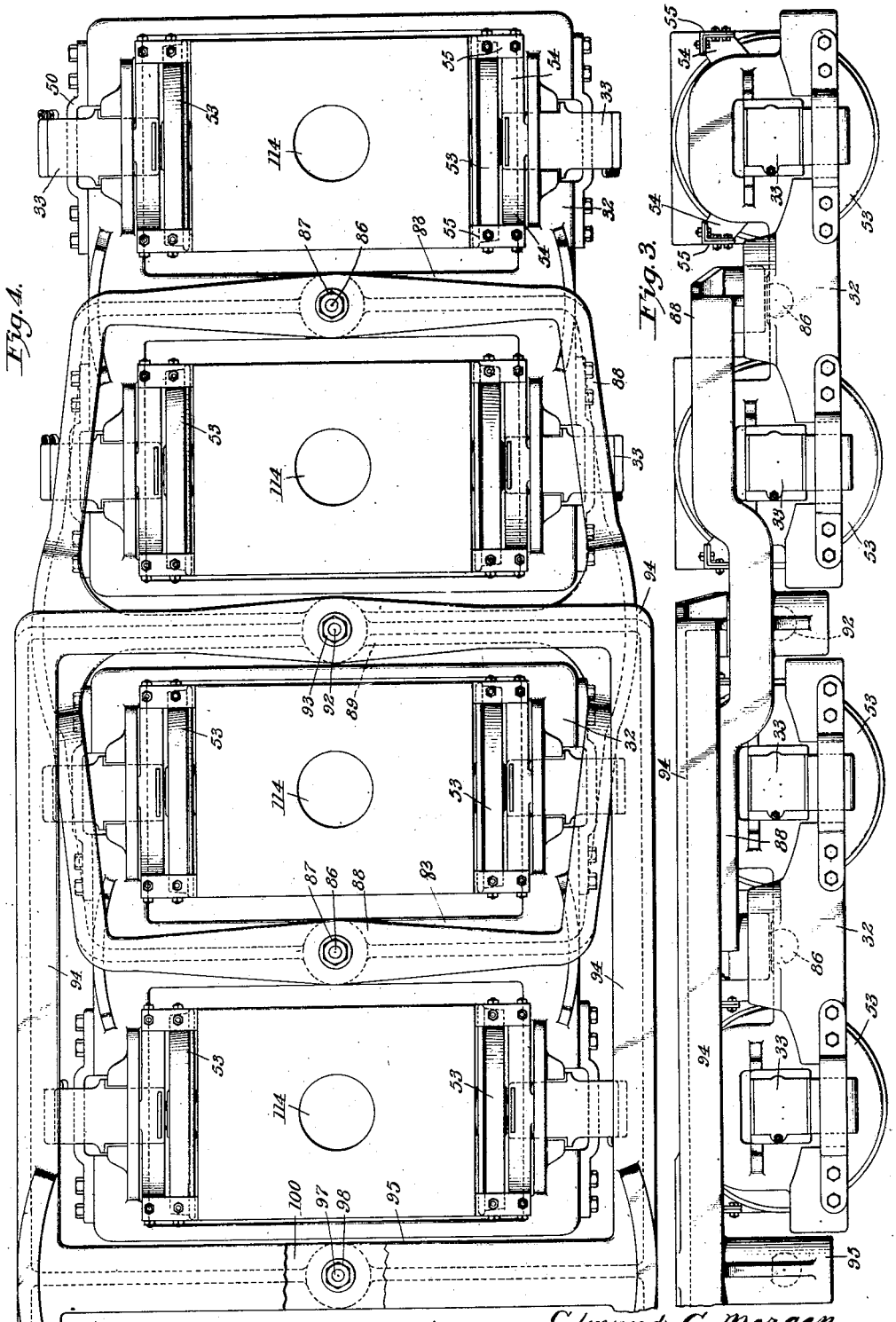
Inventor Edmund C. Morgan.

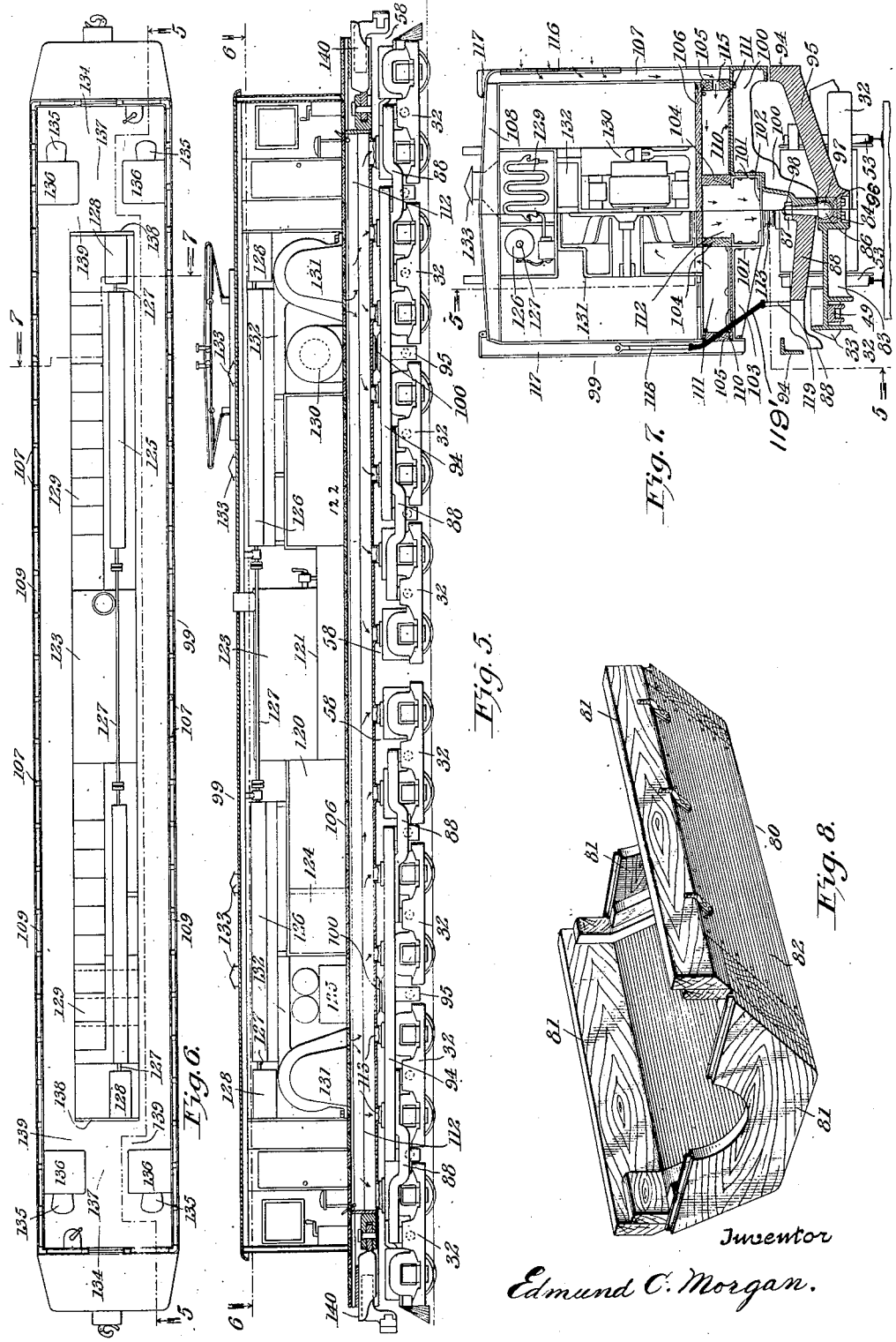

Aug. 10, 1926.  1,595,114
E. C. MORGAN
ELECTRIC LOCOMOTIVE
Filed March 21, 1922   10 Sheets-Sheet 4

Inventor
Edmund C. Morgan

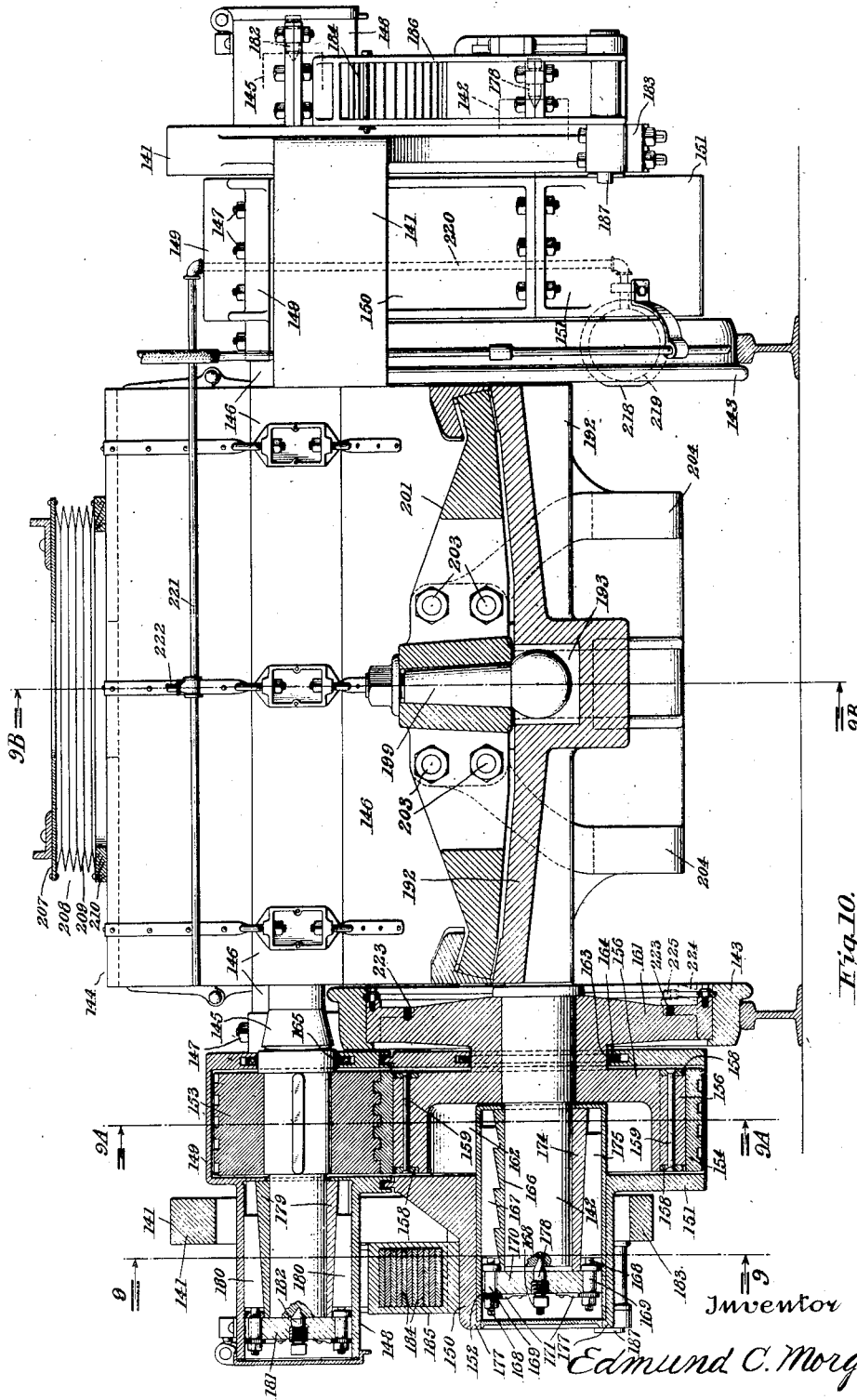

Aug. 10, 1926.
E. C. MORGAN
1,595,114
ELECTRIC LOCOMOTIVE
Filed March 21, 1922    10 Sheets-Sheet 6
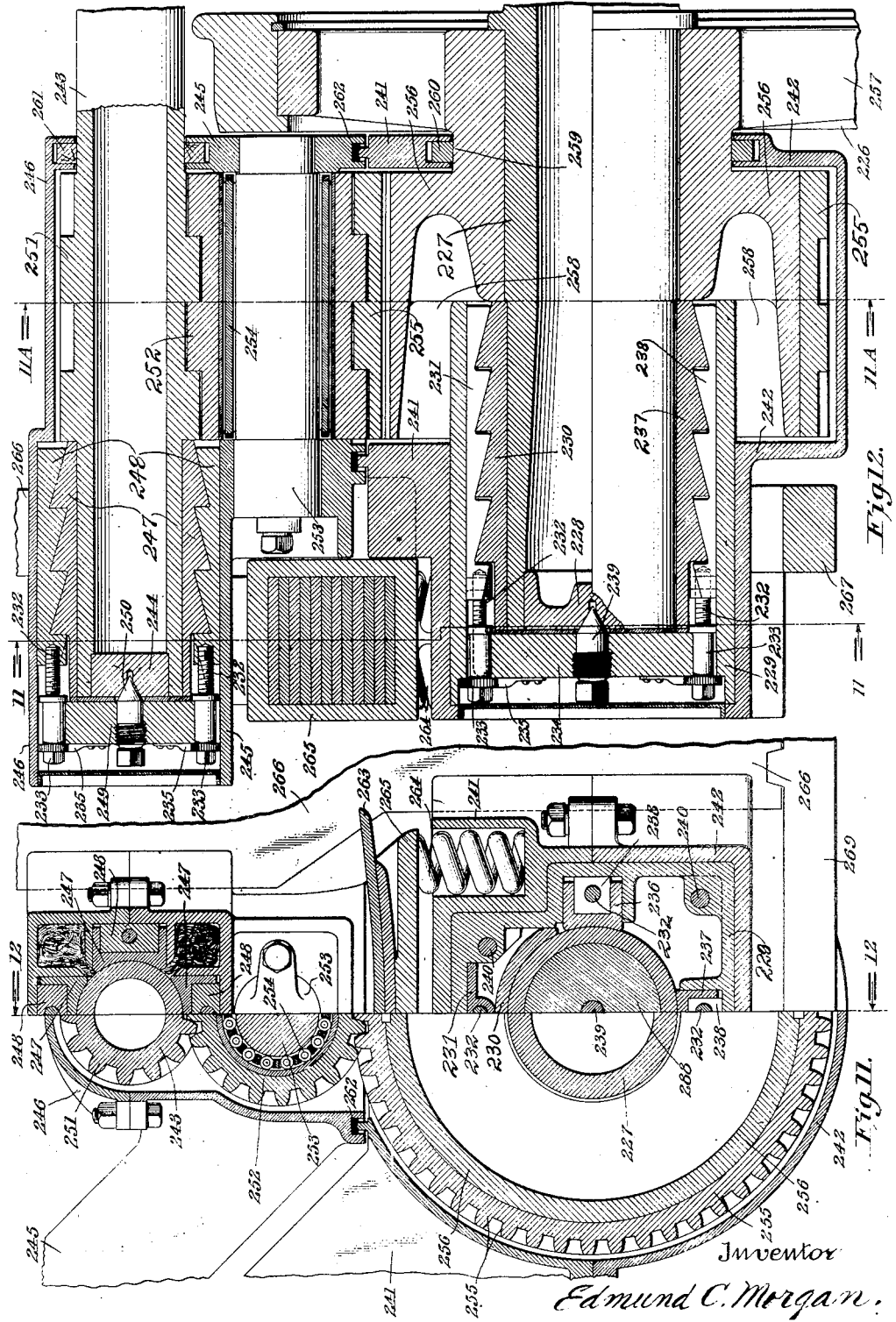
Inventor
Edmund C. Morgan Aug. 10, 1926.

E. C. MORGAN 1,595,114

ELECTRIC LOCOMOTIVE

Filed March 21, 1922    10 Sheets-Sheet 8

Inventor
Edmund C. Morgan.

Aug. 10, 1926.
E. C. MORGAN
ELECTRIC LOCOMOTIVE
Filed March 21, 1922    10 Sheets-Sheet 9
1,595,114
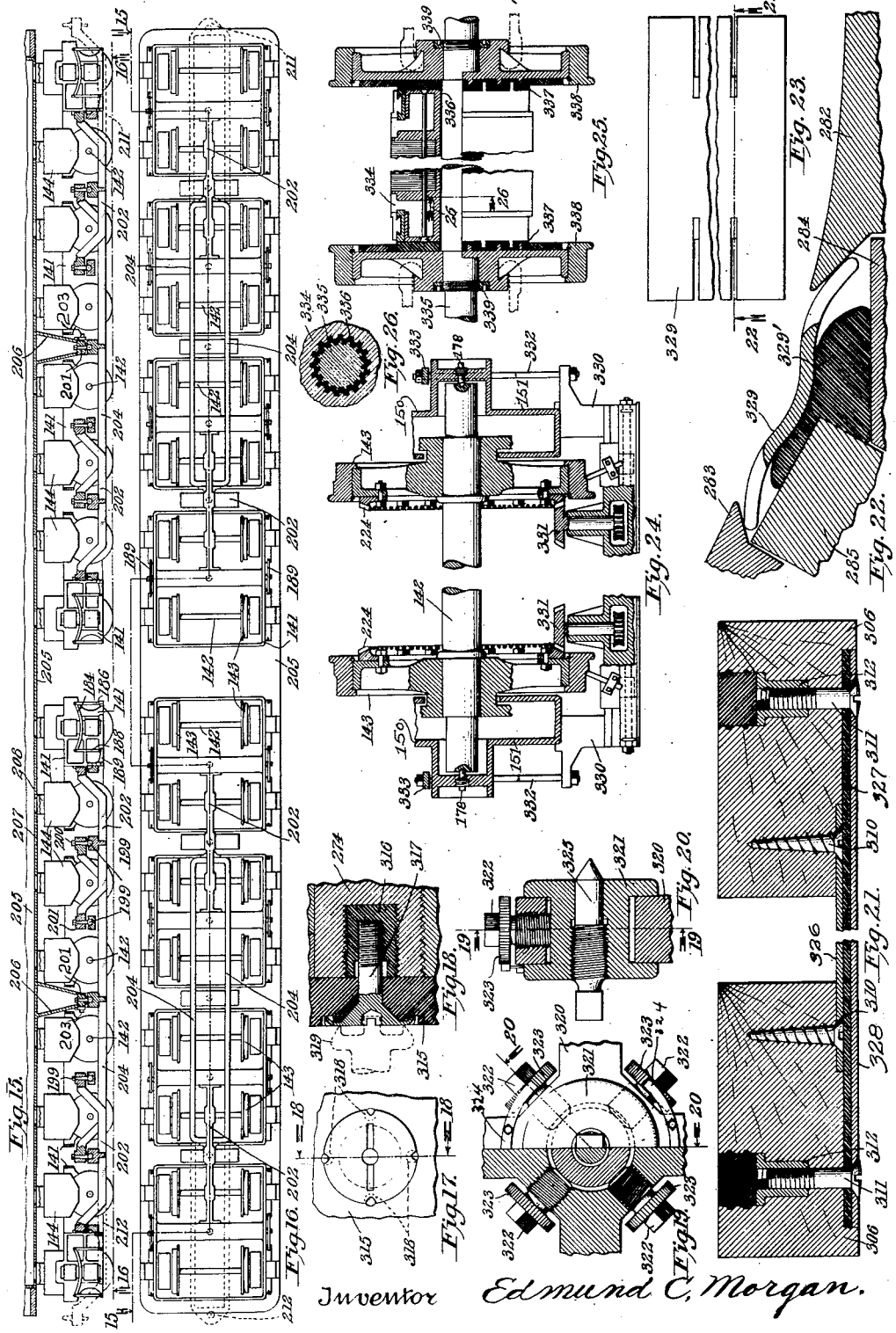
Inventor
Edmund C. Morgan.

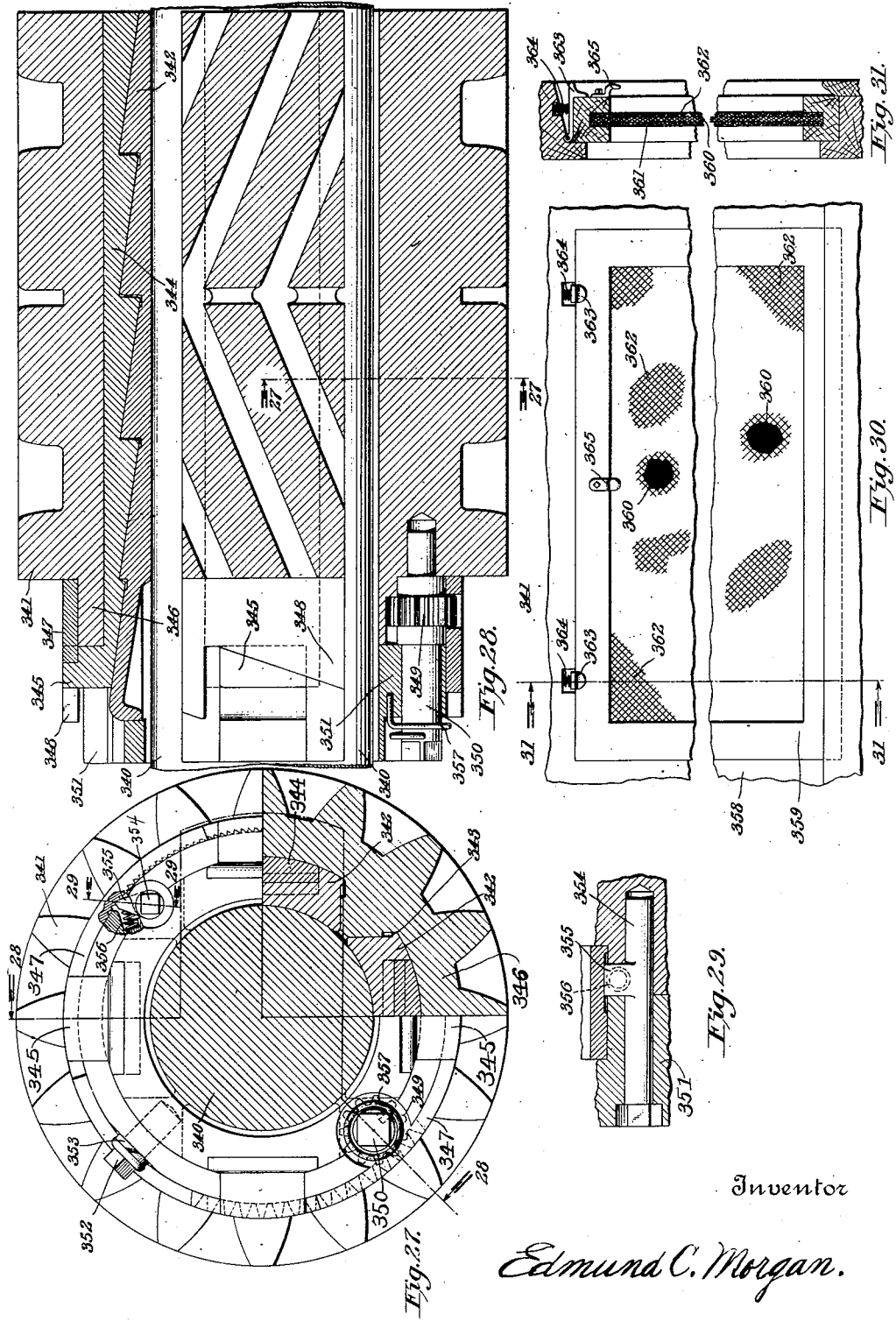

Patented Aug. 10, 1926.

1,595,114

UNITED STATES PATENT OFFICE.

EDMUND C. MORGAN, OF NEW YORK, N. Y.; OLIVE E. MORGAN ADMINISTRATRIX OF SAID EDMUND C. MORGAN, DECEASED.

ELECTRIC LOCOMOTIVE.

Application filed March 21, 1922. Serial No. 545,402.

My invention relates to improvements in electric locomotives; and the objects of the improvements are, first, to provide locomotives of the gearless type for high speed passenger service and the geared type for freight service and moderate speed passenger service with driving motors having the principal parts interchangeable so that by changes they are universal for all types mentioned, including the insulation of the motors bodily from the other parts of the locomotives; second, to provide locomotives of the gearless and geared types with trucks and connecting frames having parts common to both types; third, to provide locomotives of the gearless and geared types with a car body or cab containing controlling mechanism and ventilating mechanism with connections to the motors common to both types, and including electrical insulation of the metal parts contained in the car body from the metallic parts of the trucks and motors; fourth, to provide locomotives of the gearless and geared types in which the armatures and pole faces of the motors may be adjusted to maintain concentric relations, and the gears adjusted to keep them on the pitch lines both within close limits at all times, by means located outside of the driving wheels and remote from the motors and gears.

Other objects will appear in the specification and claims.

I attain these objects by the mechanism illustrated in the accompanying drawings, the arrows where used in the drawings indicating in all cases the direction of each view.

Figures 1 to 8 inclusive refer specifically to the gearless type. Figure 1 is a side elevation in section of a truck unit, a portion of the frame to connect two truck units together and a portion of the frame to connect two sets of connected truck units together; Figure 2 an end elevation, partly in section taken on line 2 2 Figure 1. The sections shown in Figure 1, being taken on Figure 2, are as follows: The portion to the left of the vertical center line of the drive wheels to the left out to the vertical center line of the ball headed bolt, on line 1 1; the portion to the right of the vertical center of the drive wheels to the right out to the vertical center line at the center of the truck on line 1^A 1^A; the portion to the right of the vertical center line of the truck to the vertical line 2 2, through the right hand drive wheel, and the portion at the extreme left up to the vertical center line of the ball headed bolt, on line 1^B 1^B, and the portion to the right of the vertical line 2 2, on line 1^C 1^C; Figures 3 and 4, side elevation and top plan view respectively, show two truck units, a complete frame for connecting two truck units together and slightly more than half of a frame for connecting two sets of truck units together; Figure 5 is a side elevation partly in section of a complete locomotive including the type of truck units and connecting frames shown in Figures 1, 2, 3 and 4; Figure 6 is a top plan view of Figure 5 in section taken on the line 6 6, Figure 5; Figure 7 is an end elevation in irregular section, on an enlarged scale, taken on line 7 7, Figure 6; the irregular section shown in Figure 5 is taken on line 5 5, Figure 6, combined with line 5 5, Figure 7; Figure 8 is a perspective view of one of the detachable insulating shields for the lower portions of the motors as shown in Figures 1 and 2.

Figure 13:
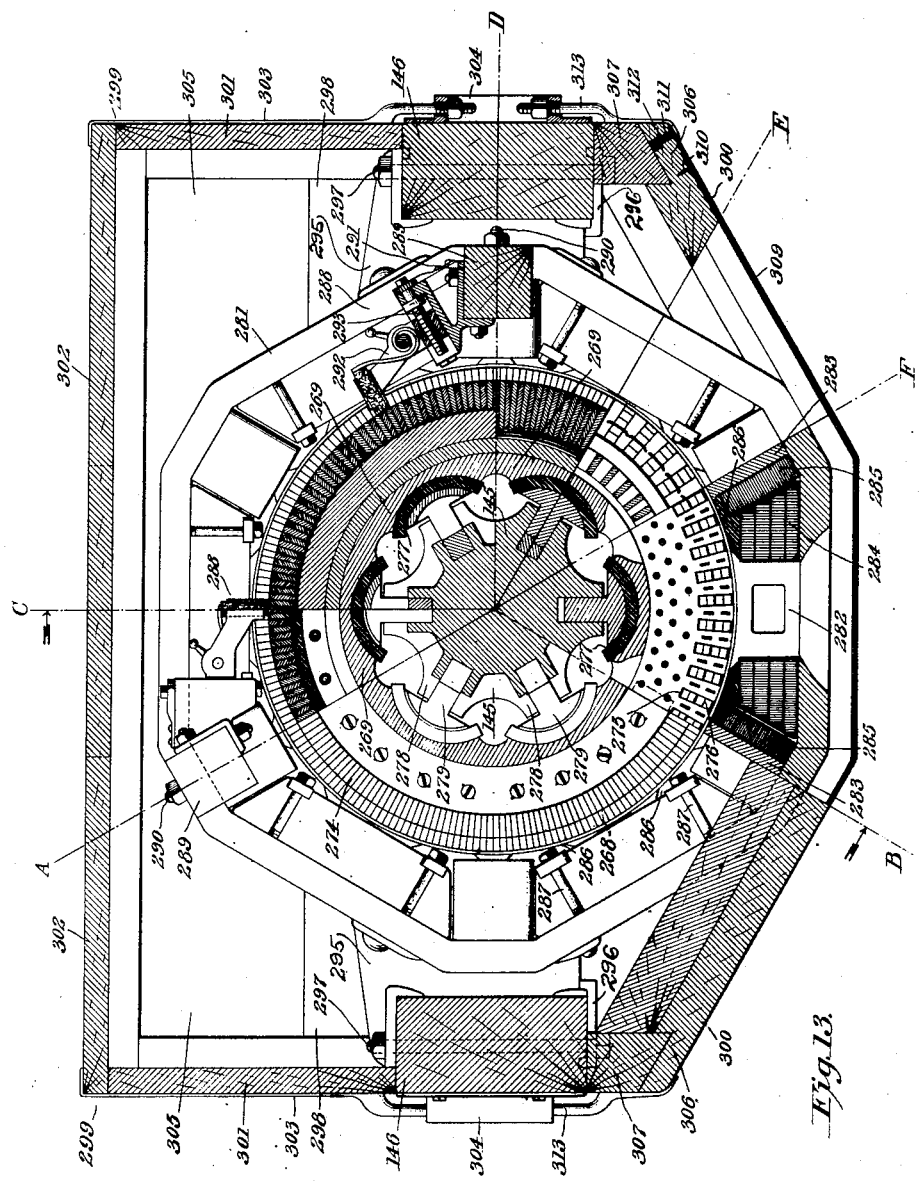
Figure 14:
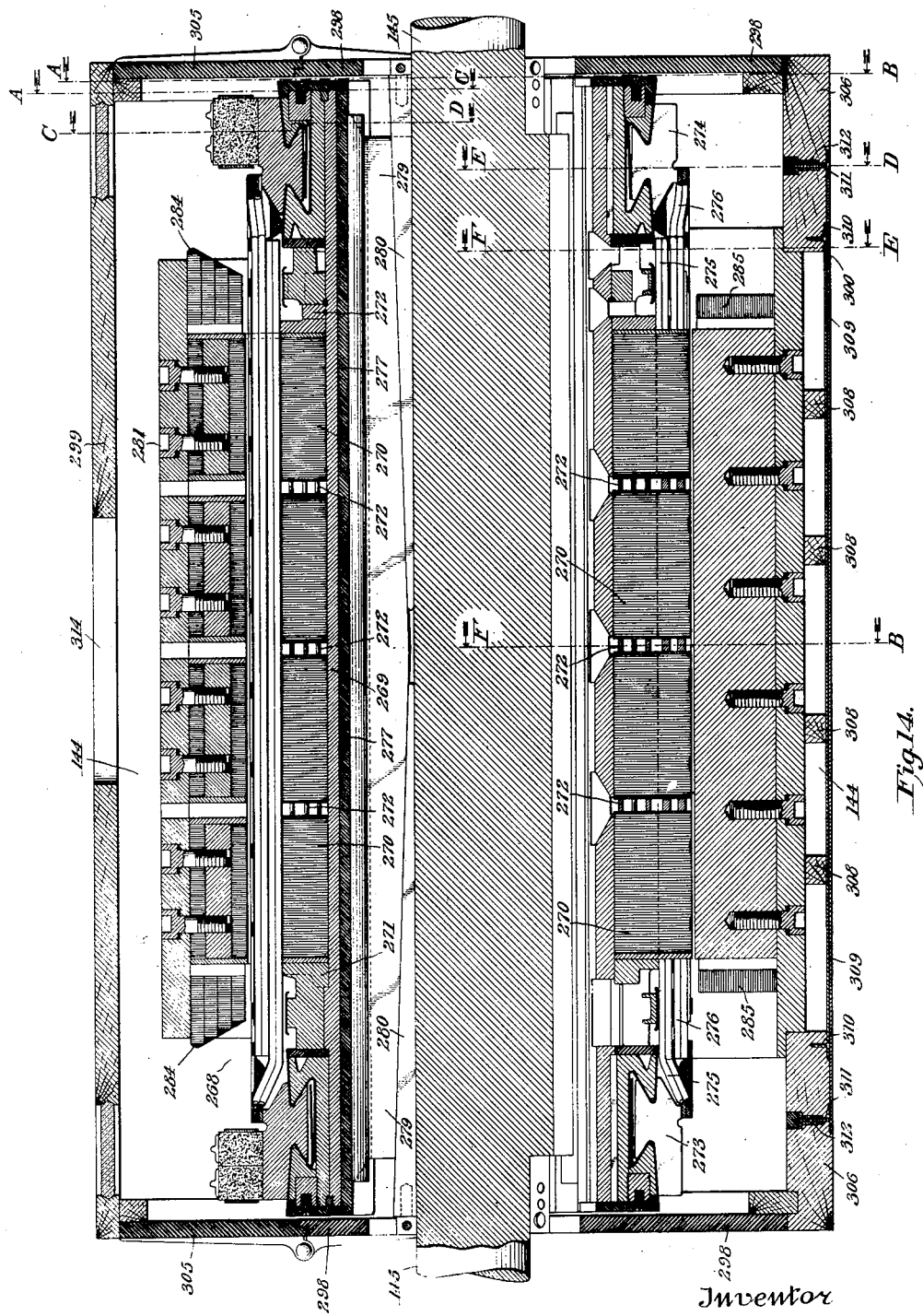

Figures 9 to 16 inclusive refer specifically to the geared type of locomotive except that the motor shown in Figures 13 and 14 is equally applicable to the gearless type with some minor changes. Figure 9 is a side elevation in section of a truck unit, a portion of the frame for connecting two truck units together and a portion of the frame for connecting two sets of connected truck units together; Figure 10 is an end elevation, partly in section, of Figure 9, with the portion between the drive wheels taken at 10 10, Figure 9, and the portion to the left taken at 10^A 10^A, Figure 9; that portion of Figure 9 to the right of a vertical line through the center of the right hand axle is taken at 9 9, Figure 10, the portion to the left of a vertical line through the center of the right hand axle and to the vertical center of the truck at 9^A 9^A and the balance to the left at 9^B 9^B, Figure 10; Figures 11 and 12 show a modified form of driving mechanism differing from that shown in Figures 9 and 10, the portion shown corresponding to the portion shown in section to the left in Figure 10 commencing at a vertical line just inside the left hand drive wheel. On account of the enlarged scale of Figure 12, the lower portion of the drive wheel shown there is broken away. The portion to the right of a vertical center line 12 12, Figure 11 is taken at 11 11, Figure 12 and the portion to the left of the vertical center line 12 12, is taken at 11ᴬ 11ᴬ, Figure 12, the section of Figure 12 being taken at 12 12, Figure 11; Figure 13 is a sectional side elevation of one of the electric motors shown in Figures 9 and 10 and Figure 14, is a sectional end elevation of same. The section in Figure 14 being taken at C B, Figure 13, the various sections in Figure 13 are taken on Figure 14 as follows: The 120 degree segment between A and B on line A B; the segment A C, on line A C; the segment C D, on line C D; the segment D E, on line D E; the segment E F, on line E F, and the segment F B, on line F B; Figure 15 is a side elevation partly in section of a complete locomotive including the type of truck units and connecting frames shown in Figures 9 and 10; Figure 16 is a bottom plan view of same. Figure 15 is taken on line 15 15, Figure 16, and Figure 16 on line 16 16, Figure 15.

Figures 17 and 18 are respectively end elevation and side elevation in full size scale of one of the insulated screws for holding in place the insulating plates at the ends of the commutators shown in Figure 14. It may also be applied to the insulating commutator end plate shown in Figure 2. The section of Figure 18 is taken on line 18 18, Figure 17; Figures 19 and 20 are end elevation partly in section, and side elevation in section of an adjustable centering screw holder for the axle and armature shaft centering screws shown in Figures 2, 10 and 12, the section of Figure 19 being taken on line 19 19, Figure 20 and the section of 20 taken on line 20 20, Figure 19; Figure 21 is a full size sectional view to show the arrangement of the sheets of metal and the sheet of insulation used in the construction of the insulating shield Figure 8; Figure 22, is a sectional end elevation of a portion of one of the main pole pieces and one of the commutating pole pieces and a portion of the field coils showing the preferred means, consisting of a strip of insulating material and a spring metal strip for holding the field coils in position, Figure 23 being a plan view of the spring metal strip of Figure 22, the section of the strip in Figure 22 being taken on line 22 22, Figure 23; Figure 24 is a side elevation of an axle with driving wheels and axle boxes with gear cases in section to represent a construction corresponding to that shown in Figure 10 and intended to show the application of gear segments to the drive wheels to accomplish the truing up of the tires without removing the axle from the locomotive; Figure 25, is a side elevation of a portion of an axle such as that shown in Figure 2, together with driving wheels in section and an armature partly in section, to show a modified form of construction of insulating and driving means, and Figure 26 is a broken section through the axle of Figure 25, taken on line 26 26, Figure 25; Figures 27 and 28 are respectively end elevation, partly in section, and side elevation in section to show a modified form of idler gear wheel differing from that shown in Figures 11 and 12, the section of Figure 27 being taken on line 27 27, Figure 28, and the section of Figure 28 taken on line 28 28, Figure 27; Figure 29 is a section of a portion of Figure 27 taken on line 29 29, to show the ratchet shaft; and Figures 30 and 31 are side elevation and sectional end view respectively of one of the air filtering sashes for the car body as shown in Figure 7, the section of Figure 31 being taken on line 31 31, Figure 30.

Similar reference signs refer to similar parts throughout the several views.

Referring to Figures 1 and 2, the truck frame 32 is made with gaps to receive the axle boxes 33, each of which is provided with a main bearing 34, on the top surface of which is formed a series of wedge faces, and interposed between these wedge faces and the inside surface of the top of the axle box, with clearance for sliding movement, is a wedge block 35, to which is secured a screw threaded stud bolt 36, having a nut 37, made with two flanges with a journal formed between them to fit into a slot in the bearing block 38 which is bolted to the axle box. The bearing block 38 has a hole which is threaded about half of its length to receive a cone pointed axle centering screw 39, which is threaded about half of its length near the head. A wearing plate 40, having a hole concentric with the hole in the bearing block is riveted or otherwise attached to the bearing block. Each axle box is also formed with a narrow groove at the lower inside surface having a tapering bottom face in which is carried a wedge shaped bearing 41, which has secured to it a threaded stud bolt 42, having a nut 43, made with two flanges with a journal formed between the flanges to fit into a bearing groove in the bearing block 38. By this mechanism it will be seen that the bearing 41 may be adjusted to prevent any upward movement of the axle box caused by jolting over rough track; each axle box is provided with a dust guard 44. Each axle box is also provided with a downwardly projecting loop shaped piece 45, preferably cast integral with the axle box, and in which a pocket is formed to receive a plurality of short helical springs 46, to form a spring support for one of the main leaf springs 47, the band 48 of which is elongated at the bottom side to extend over the helical springs. The outer end of each main spring 47 has the truck frame 32 bearing directly on it. The inner ends of each set of two opposing main springs 47, carry an equalizer bar 49, which receives at its center, on the curved upper surface, the truck frame 32, there being one equalizer bar 49 at each side of the truck frame. The axle box gaps of the truck frame are provided with brace bars 50, secured to the truck frame by the bolts 51.

The axles 52, on which are mounted the drive wheels 53, are carried in the axle boxes 33, and each axle has a cone shaped depression formed at its exact axial center at each end to accurately fit the cone shaped points of the centering screws 39. The axle boxes 33, two for each axle, are held in parallel alignment with the axle as follows: Extending outwardly and upwardly from each axle box are two arms 54, the ends of which are connected across near the faces of the threads of the drive wheels to the ends of two similar arms of the axle box opposite on the same axle by the angle bars 55, being detachably secured together by the bolts 56. The arms 54 are electrically insulated from the connecting bars 55 by means of insulation 57 together with suitable insulation around the bolts 56; and from the construction just described it will be seen that when the centering screws 39 of a pair of opposite axle boxes are turned up tight, the axle will always be brought to a fixed position with respect to the axle boxes.

I will now describe one of the axle driving motors and its mountings, which will serve for all as they are all alike. Reference numeral 58 indicates the electric motor as a whole, which consists of an armature 59 mounted on the axle 52 but electrically insulated therefrom; and a field frame 60, mounted on the connecting bars 55, but electrically insulated therefrom. The armature, consisting of commutator 61, coils 62, insulation etc., is built up on the metal spider 63 which has a series of curved faces on its inside surface, running taperingly with the bore, which fit curved strips 64 of insulating material. Cut integral with the axle 52, on that part which extends through the bore of the spider 63, are a series of grooved projections tapered along the axle to correspond to the taper of the bore of the spider, and in each of these grooved projections is fitted a T head bar 65, having its head curved to fit the curve of the insulating strips 64, and a wedge shaped bar 66, which, when driven in tightly, enables a strong driving connection to be made between the axle and the spider. The bars 66 are secured in place and also provided to be kept tight in case of any shrinkage of the insulating strips by the helical springs 67, one of which is provided for each wedge bar and all held in place and adjusted for tension by the nut 68, screwed on the axle. It will be noted that the ends of the insulating strips 64, at the small end of the tapering bore of the spider, abut against a disc 69, of insulating material, which is reinforced by another disc 70, and both held in place by the nut 71, screwed on the axle. It will be noted that the insulating disc 69 extends to the insulation of the commutator, thus providing a long gap of metal parts and preventing the electric current from flashing from the end of the commutator.

The field frame 60 of the motor on which are mounted the main poles 72 and the commutator poles 73 together with their coils, insulation, etc., is carried on the connecting bars 55 of the axle boxes by means of the inverted T head cross bars 74, which are provided with insulating conduits 75, and are clamped tightly over the insulation to the connecting bars 55 and the field frame 60 respectively by clamping pieces 76 and 77, with suitable bolts as 78 extending into the connecting bars and field frame. The electric motor is enclosed at the top, sides and the upper part of the ends by the insulating box 79, carried on the bars 55, and enclosed at the bottom and the lower part of the ends by the detachable insulating shield 80, carried on the insulating box 79 and consisting of a framework 81, made of insulating material bound with a trough 82, composed of an inside and outside layer of sheet iron with a sheet of high insulating material such as mica between them. This shield is further illustrated by the perspective view Figure 8. By the various insulating means described, it will be seen that the electric motor is bodily insulated from the other parts of the truck frame, and the armature insulated from the field frame; also that the entire motor is insulated from contact in any direction. As the insulation is non-metallic, it will also be noted that the motor is free from direct metallic transmission of the jars received by the truck and thus the tendency to crystallization of the parts greatly lessened.

The truck frame 32 is provided with a cross frame 83 central of its length and preferably cast integral therewith. In this cross frame, central laterally of the truck, is a recess in which is fitted ball socket bearing 84, split vertically into two pieces for assembly purposes and secured in the recess by suitable bolts as 85. In this bearing is carried a vertical ball headed bolt 86, having a tapered shank and provided with a nut 87 at its upper end.

The truck frame 32, as described, with the axle boxes, axles, wheels and motors forms a complete operative unit and can be coupled directly to a car body by means of the ball headed bolt 86, or it may be connected by frame work to other trucks to form a locomotive having a plurality of similar trucks; as shown, it is connected in the latter way, being connected to a frame 88, part of which is shown in Figures 1 and 2, but more fully shown in Figure 3 and 4. This frame is provided with a tapered hole at each end to fit the ball headed bolts 86, one for each truck, and thus connect two trucks together. The frame 88 has a cross frame 89 at the lateral center of which is a recess, a ball socket bearing 90, bolts 91, ball headed bolt 92, and nut 93, corresponding respectively to the parts 84, 85, 86 and 87 for the cross frame of the truck 32, described above. The four axle truck formed by connecting two truck units together by the frame 88, may be attached directly to a car body by the ball headed bolt 92, or two such four axle trucks may be connected together by means of a connecting frame 94, one end of which is shown in Figure 2, a little over half shown in Figures 3 and 4, and all shown in side elevation in Figure 5, and in section in Figure 7. This frame 94 is provided with a tapered hole at one end to fit the ball headed bolt 92 on the cross frame 89 of the frame 88 and a tapered hole in the other end to fit a similar ball headed bolt 92 in another similar eight wheeled truck to form a sixteen wheel truck as shown in Figure 5. The connecting frame 94 has a cross frame 95 midway of its length which is provided with bearing 96, ball headed bolt 97, and nut 98, corresponding to the parts 84, 86 and 87 described in connection with cross frame 83 of truck frame 32. The car body or cab 99 Figures 5, 6 and 7, is provided with two bolsters 100, each having a tapered hole to fit a ball headed bolt 97 in the cross frame 95 of each of two frames 94, and these parts serve to join the truck together and thus form a thirty two wheeled locomotive, as shown in Figure 5.

I will now describe the car body or cab 99, as shown in Figures 5, 6 and 7. The underframing is of steel, consisting of the channels 101, the plate 102, the channels and plates being approximately the length of the car body, and the side supports 103, which are spaced at suitable intervals and riveted to the channels. On this structure is attached the wooden part of the body, consisting of the center timbers 104, the side timbers 105, all running through a floor 106, consisting of cross planking, laid on the timbers 104 and 105, the upright timbers 107, to which the roof timbers 108 are attached, and covering inside and outside, of boards running lengthwise of the car body. A large number of spaces as 109, are formed by the uprights and covering. The side supports 103 are also covered with boards running lengthwise of the car body to form floors 110. It will be noted that two closed side spaces 111 and one closed center space 112 running the length of the car body are formed by the construction described. The plate 102 has a series of holes cut in it to register over the center of the motors 58 and at each hole a flexible conduit as 113 is attached, with its lower part slidably supported on a motor covering and registering with a hole 114 in the covering, as shown in Figures 1 and 2. Some of the upright spaces 109 are made to communicate with spaces 111, by means of holes 115 and in the upper part of spaces 109 that so communicate, air screening windows 116 are placed to admit air to the spaces 109. In some of the other spaces 109, sand boxes 117 are placed, with metal piping 118 at the box and 119 on the truck frames 32, connected by flexible rubber pipes 119' to provide the necessary flexibility and also to electrically insulate the sand boxes from the trucks. Other of the spaces 109 are used to carry electric wires.

In a central space between the floor 106 and the roof of the car, with passageways all around for attendants is placed the accessory apparatus, which consists of water and oil tanks 120, 121 and 122; heating boiler 123; electric storage battery 124; air pump and reservoirs 125; two controlling cylinders 126, both mounted on a shaft 127 extending approximately the length of the space occupied by the accessory apparatus and terminating at each end in boxes 128; the rheostats 129; a motor generating set 130; and power air blowers 131, which draw fresh air from the passages 111 and force most of it into the passage 112 where it passes to the motors 58 via the conduits 113, and a small portion to the rheostats 129 by means of conduits 132 which passes out at chimneys 133. At each end of the car body is an operating cab 134, provided with seats 135 and back of each seat is a closet 136, with a passageway 137, between each pair of closets with a partition 138 made of insulating material facing each passageway 137, thus forming passageways 139 which communicate with the passageways running at each side of the accessory apparatus. Hinged couplers 140 are shown attached to the car body but these may be carried by extension framework from the frames 94 if desired, and in which case the car body framework would be cut away, enough to leave ample clearance for the movement of the drawbars independently of the car body.

Figures 9 to 16 inclusive refer to a modified form of my invention containing some of the broad principles of the construction described in connection with Figures 1 to 8 inclusive, but in which the power of the motors is transmitted to the axles through gearing and the truck connecting frames, while operating on exactly the same broad principles, are carried beneath the axles and between the driving wheels instead of above and outside the driving wheels as in the other.

Referring to Figures 9 and 10—141 is the truck frame, in which are mounted two axles 142, each having two drive wheels 143 with each axle having an electric motor 144 provided with a shaft 145 to drive the axle. As this motor and its mountings is illustrated on a larger scale and more completely in Figures 13 and 14, it will be further described by itself.

I will confine my description to one of the two axle units shown in Figures 9 and 10 as they are exactly alike and description of one will serve for both. The motor 144 is provided with two supporting beams 146, which, as shown, are of wood but which may be of insulated steel similar to those shown in connection with Figures 1 and 2, if desired. These beams extend between the sides of the truck frames 141 with their ends in close proximity thereto. To the ends of these beams are secured by means of suitable bolts 147, the castings 148, which with their caps 149, each set bolted together on a horizontal line running through the center of the armature shaft, form the bearing boxes for the armature shaft 145 and part of the shroudings for the gears and the castings 150, which with their bottom caps 151, each set bolted on a horizontal line running through the center of the axle, contain the axle boxes 152, and form part of the shroudings for the gearing. For brevity I will confine the description to the gearing and other parts of the mechanism at one end of the axle 142, which will serve for both ends as they are exactly alike. The gears are of the helical form and the armature pinion 153 is keyed to the armature shaft 145. The gear 154 is in the form of a ring with a series of inwardly projecting lugs 155. The gear center 156 has a series of lugs 157 cast on its periphery extending between the lugs 155 of the gear rings and the lugs 157 carry rings 158, Fig. 10 by means of rivets 159. These rings 158 enclose the lugs 155 at the sides. Helical springs 160 are placed between the lugs 155 and the lugs 157 to provide for a small amount of circumferential resilient movement between the gear rings and their centers, the rings 158 serving to hold them in place laterally. This resilient means is for the purpose of providing for compensation for any difference in the gears on one end of the shaft and the gears on the ends of the axle, but my preferred arrangement is to make the helical pinion on one end of the armature shaft with teeth opposed to the teeth on the other end of the shaft and allow a slight end play in the shaft which will provide for any inequality of the gears and avoid the necessity of the resilient means for the purpose. The gear center 156 is cast integrally with the center 161 of the driving wheel 143, and the two secured to the axle as one piece. This construction permits of a large dish shaped aperture 162, to be made in the outer side of the gear center and in this the axle box 152 extends so as to secure ample length for the axle bearing and at the same time keep the overall length across the axle boxes within permissible limits. The hub 163 between the gear center and the driving wheel center is turned true and provided with a dust guard 164. A similar dust guard 165 is provided for the motor shaft 145 next to the pinion 153. The main axle bearing 166 in the axle box 152 is provided with wedge shaped faces on its upper side and a wedge block 167, shown in full side view, placed between it and the inside surface of the top of the box, and a stud bolt 168 is secured to it and provided with a nut 169 having two flanges with a journal formed between the flanges which fits into a slot in the center plate 170 forming a bearing, the flanges acting as end bearings to prevent endwise movement. The outer flange of the nut 169 is notched and a spring clip 171, which is riveted to the center plate 170 is arranged with its end to bear in the notches and thus lock the nut in adjusted position. A large number of stud bolts like 168 with nuts like 169 and locking clips like 171 are employed in the locomotive and to avoid unnecessary lengthening of the specification the same reference numerals will be used on them and this description answers for all; additional bearing blocks 172 are provided for the sides of the axle journal. They are exactly like the main bearing 166 except for being narrower. They are provided with wedge blocks 173 similar to wedge block 167 except narrower to correspond to the width of the bearing 172. These wedge blocks are provided with stud bolts 168, nuts 169, and locking clips 171 in the center plate 170. Another narrow bearing block 174 is provided for the under side of the axle journal and provided with a wedge block 175, shown in full side view. As only a small adjusting movement is required here, a single wedge face is used. The wedge block 175 is provided with stud bolt 168, nut 169, and locking clip 171 in the center plate 170. The center plate 170 is bolted into the axle box 152 by the bolts 176, half of which show in the section to the right of the right-hand axle box Figure 9, a similar number with corresponding location being used for the other side of the box. Abutments 177 are provided in the castings 150 and 151 to keep the axle box from outward endwise movement. The center plate 170 is provided with the axle centering screw 178, with a cone shaped point adapted to fit a cone shaped center in the axle 142 and when set up together with a similar screw in the opposite end of the axle, will always bring the axle to a predetermined position with respect to the axle box.

Four adjustable bearing blocks 179, at top, bottom and sides of the journal of the armature shaft 145 are provided, each having a wedge block 180, the top and bottom ones being shown in full Figure 10, and each wedge block provided with stud bolt 168, nut 169 and locking clip 171 in the motor shaft centering plate 181, which is similar to centering plate 170 in the axle box. The center plate 181 is bolted to the motor bearing box of the castings 148 and 149. The motor centering plate 181 is provided with a centering screw 182, having a cone shaped point adapted to fit a cone shaped center in the end of the motor shaft 145, and when set up together with a similar centering screw at the other end of the shaft will always bring the motor shaft to a predetermined position with respect to the motor shaft box.

By means of axle centering screws and motor shaft centering screws as described above, together with the adjustable bearings, it will be seen that the gears can easily be kept adjusted to the pitch lines within close limits and the armature of the motor kept concentric with the pole faces within close limits.

The castings 148, 149, 150 and 151, opposite the motor bearing and the axle bearing, are provided with flanges, to form vertical channels which fit the vertical ways formed in the sides of one of the gaps in the truck frame 141, to provide for resilient vertical movement of the truck frame on the axle. The gap in the truck frame is connected across at the bottom by the brace 183, secured to the truck frame by suitable bolts. A leaf spring 184, with its band 185 curved at the bottom rests on the curved surface formed in the casting 150 above the axle box 152. This spring is provided with hanger bar 186 pivoted in the truck frame by bolt 187, and with hanger bar 188 pivoted in equalizing bar 189 by bolt 190. The equalizer bar 189 is pivoted at its center on truck frame 141 by bolt 191, Figure 9. From the bolt 191 the same description of spring, hangers, bolts and the other half of the equalizer bar 189 will apply for the axle to the left of the drawing.

The truck frame 141 is provided with a cross frame 192 central of its length and preferably cast integral therewith. In this cross frame, central laterally of the truck, is a recess in which is fitted a ball socket bearing composed of two pieces 193, each having a wedge shaped back and provided with a wedge block 194 having a stud bolt 195 with a nut 196 having two flanges with a journal between held in a bearing block 197 attached to the cross frame 192. The lower flange of the nut 196 is notched and is provided with a locking clip 198 attached to the bearing block 197. In the ball socket bearing formed by the two pieces 193 is carried in a vertical position, a ball headed bolt 199, having a tapered shank and a nut 200 at its upper end.

The truck frame 141, as described, with axle boxes, axles, wheels and motors forms a complete truck unit. Two or more of these may be coupled together to form a locomotive. As shown in Figures 15 and 16, eight truck units are pivotally coupled together to form a locomotive. The truck units are first coupled together in pairs by frames and these frames coupled together by other frames to form two trucks of four truck units each. The last mentioned frames are then coupled to the car body or cab of the locomotive.

I will now describe the connecting frames and connections of the truck units to form a locomotive as shown in Figures 15 and 16 all of the couplings being made by means of ball headed bolts like 199 placed so the centers of the ball heads are on a straight horizontal line intersecting the centers of all of the axles 142 and central laterally of the ends of the axles, and each placed equidistant between two axles. I prefer, however, to locate the centers of the ball heads on a horizontal line running somewhat below the centers of the axles, determined by the capacity of the motors of the trucks, so that the draw-bar pull or push will counteract and balance the tendency of the rear motor of a truck when pushing or pulling the connecting frame to lift the front end of the truck off of the track and unbalance the weight on the driving wheels. To each of these ball headed bolts is attached a bolster 201, Figures 9 and 10. The ends of the frames 202 connecting the axle units together are connected to the bolsters 201 by the bolts 203, dove tail construction being employed to increase the strength. Central of the length of each frame 202 is mounted a ball headed bolt 199, the same as the ones in the beam 192 of the truck frames 141, and to these bolsters 201, corresponding to the bolsters 201 which are attached to the frame 202 are attached. These bolsters are attached to the ends of the frames 204, by means of other bolts 203. The bolsters employed in connecting the truck units are clearly illustrated at 201 in Fig. 10. A plurality of such bolsters are used in horizontal alinement. Central of the length of each frame 204 is mounted a ball headed bolt 199 and bolster 201 in the same manner as those just described for the frames 202. The two frames 204 are connected together by the car body 205, by means of pedestals 206 connected to the bolsters 201 by bolts 203. The car body 205 which is of the same construction as car body 99, Figures 5, 6 and 7, has a plate 207, corresponding to plate 102 Figures 5, 6 and 7, having a series of holes one located over each motor 144 and connected to a hole in the top of the motor covering by the flexible conduit 208, Figures 9 and 10. This conduit consists of a series of thin discs connected together 209, riveted at one end to the plate 207 and at the other end to the wooden ring 210 which rests slidingly on top of the motor covering. The car body 205 may be provided with draw bars the same as 140 Figs. 5 and 6, but I prefer to make the draw bars in extensions of the frames 204 as indicated by the dotted lines 211 and 212.

The trucks 141 are provided with brake shoes 214, supported on the beams 192 by brackets 215, links 216, pins 217. Air brake cylinders 218, attached to the beams 192, with pistons 219 adapted to bear on the brake shoes are provided, one set at each side of a truck frame. The pipe 220, one for each brake cylinder, is brought down at the outer side of the cylinder and connected inwardly to the cylinder. These pipes 220 are connected by a pipe 221 having a connection 222 to supply compressed air to both cylinders and thus provide equal pressure for the brake shoes, all as shown in Figs. 9 and 10.

Each driving wheel center 161 has a finished inner face near the periphery and tapped holes 223 to provide for attaching segments of gearing 224 by bolts 225, indicated in dotted lines Fig. 10 to enable the wheels to be revolved in connection with apparatus for truing the tires of the wheels without removal from the locomotive, the centering bolts 178 with which the axle boxes are provided with making this practical as further shown in Fig. 24, which will be referred to further along.

Referring to Figs. 11 and 12, which show modifications of the structure shown in Figs. 9 and 10, in the respect that an idler gear wheel is employed to enable more powerful gearing to be used with the same size drive wheels and approximately the same centers between axle and motor shaft. Only one end of an axle with part of one drive wheel is shown as duplication of the parts shown for the other end of the axle and extension across the axle and motor shaft to connect will constitute an axle unit, 226 is a drive wheel; 227 the axle, which is made hollow to enable it to be made of large diameter and still be light. It is provided with an end piece 228 in which a cone shaped center is formed. 229 is the axle box with main bearing 230 having wedge shaped surfaces at its top, and 231 is a wedge block for the main bearing, provided with a stud bolt 232 and nut 233, held in a bearing in the centering plate 234. The nut 233 has flanges to hold it against endwise movement with the outer flange notched and provided with a spring locking clip 235, riveted to the plate 234. As a number of the stud bolts 232, nuts 233 and spring clips 235 are used and are all alike, to save repetition of description, I will refer to them by the same numbers and the description given will apply to each set. The axle box has two side bearings 236, and a bottom bearing 237, each provided with a wedge block 238 and each provided with a stud bolt 232, nut 233 and locking clip 235 carried in the centering plate 234. The centering plate 234 has a centering screw 239 with a cone shaped point made to fit the cone shaped center of the axle block 228. The centering plate is bolted to the axle box by four bolts 240, two on each side. The axle box 229 is supported in castings 241 and 242, corresponding to castings 150 and 151 respectively of Figs. 9 and 10, with abutment to prevent outward end movement of the axle box. The motor shaft 243 is made hollow and has an end block 244 with a cone shaped center made in it. It is supported in a bearing box formed by the castings 245 and 246 corresponding to castings 148 and 149 respectively Figs 9 and 10. Four adjustable bearings 247 are provided for the journal of the motor shaft, each having wedge shaped faces and provided with a wedge block 248 having a stud bolt 232, nut 233, and locking clip 235, carried in the centering plate 249. The centering plate 249 has a centering screw 250 with a cone shaped point adapted to fit the cone shaped center in the block 244 of the motor shaft.

The gearing is of the helical type and the teeth of the pinion 251 are formed integral with the motor shaft. These mesh with the teeth of idler gear wheel 252, mounted on a stationary shaft 253 carried in the casting 245. As shown, it is provided with a roller bearing 254, but as this class of machinery is desired to be very rugged, reliable and adjustable for wear, I provide an adjustable plain bearing shown in Figs. 27 and 28 which will be explained further along. The idler gear 252 meshes with the axle gear 255, which is shrunk on, with keys, to the axle gear center 256. This is cast integral with the driving wheel center 257 and is formed with a hollow space 258 to permit the axle box to be made long without exceeding the permissible width outside of the track rail. The hub 259 of the gear and driving wheel centers 256 and 257 is turned true and has a dust guard 260, which is carried in the casting 241 and 242. The motor shaft 243 is also provided with a dust guard 261, carried in the castings 245 and 246. The joint between the casting 245 and casting 241 is made dust and oil tight by the packing 262. The leaf axle spring 263, corresponding to leaf axle spring 184 Figs. 9 and 10 is mounted on the casting 241 on helical springs 264, carried in pockets in the casting. Only two short lower leaves of the leaf spring are shown together with the lower portion of the band 265 in Fig. 11, the rest being broken away to show parts beyond. The truck frame 266 with brace 267, corresponds to truck frame 141 and brace 183 Figs. 9 and 10.

I will now describe the motor 141, Figs. 9 and 10 more in detail.

Referring to Figs. 13 and 14, the armature designated as a whole by reference numeral 268, consists of a sleeve 269, on which are the discs 270, secured by end plates 271 and 272. Spacer rings 272 are provided to form air passages to the inside of the sleeve 269. Air passageways to the inside of the sleeve are also provided between the ends of the discs and the commutators 273 and 274. The armature is intended to safely operate on current of 3000 volts pressure with 6000 volts pressure across the line. Two sets of windings are provided in separate layers, but in the same slots. The windings 275 are connected to commutator 273 and the winding 276 to commutator 274.

The sleeve 269 is provided with curved faces on its inner side throughout its length, in which curved strips 277 of insulating material are fitted. Formed integral with the shaft 145, on that part that extends through the armature, are a series of grooved projections 278, in the grooves of which are fitted T head bars 279, which are tapered each way from the center at the bottom edge and have the heads curved to fit the inside curve of the insulating strips 277. Two wedge bars 280 are provided for each T bar 279 and when these are driven in between the bottoms of the grooves and the grooved projections 278 and the tapering edges of the T bars 279 they cause the curved heads of the bars to bind tightly the insulating strips 277 and secure the armature to the shaft.

The field frame consists of the magnet ring 281 to which the main pole pieces 282 and the commutating pole pieces 283 are bolted. They are provided respectively with coils 284 and 285, which, in addition to being held by the flare of the pole pieces, are held by the strips of insulating composition 286, which are secured at the ends to the magnet ring by the bolts 287. A preferred form of fastening is shown in Figs. 22 and 23, which will be described further along.

Radially adjustable brush holders are provided, 288 which are secured to the magnet ring by the insulating blocks 289 and bolts 290.

I will describe one which will serve for all. The base 291 is bolted to the insulating block 289 and in this the brush holder piece 292 is mounted in a groove to slide toward and away from the commutator. A stud bolt 293, with a threaded portion, which extends through a threaded portion of the brush holding piece 292, is mounted with a bearing in the base 291 with flanges to prevent end movement. The outer flange is notched and has a spring locking clip which is riveted to the base 291. The head of the stud bolt 293 is squared to receive a wrench to make the adjustments.

Brackets 295 are riveted to the magnet ring and bear on the inner sides and the tops of the beams 146, space being left between the magnet frame and beam for air to pass. Plates 296 are provided for the bottoms of the beams which hook over the brackets 295 and both bracket and plate, one on each side, are secured to the beams by bolts 297.

The motor 144 is bodily electrically insulated from the other parts of the locomotive and the armature from the field frame by the beams 146, the side pieces 298 of insulating material attached to the beams, and the top and bottom covers 299 and 300. The top cover consists of the end pieces 301 and top piece 302, secured together by strips of insulating material on the inside and on the outside, by the strap bolts 303 which connect to the brackets 304 on the beams 146 and hold the cover securely in place. Easy ingress to the commutators is provided by the hinged doors 305 of insulating material carried in the side pieces 298. The bottom cover 300, consists of the bent pieces 306 connected together at the ends by the straight pieces 307 and narrow strips 308 bent to conform to the shape of the pieces 306 and fastened at their ends to the pieces 307. This framework is covered by the three piece pan 309, composed of two metal sheets with a sheet of insulating material between, attached to the frame work by wood screws 310 and machine screws 311 with nuts 312, and the strap bolts 313 which bolt into the brackets 304 on the beams 146 and hold the cover 300 securely in place. The top cover is provided with a hole 314 to admit the forced draught of ventilating air and it will be noted that the covering of the motor is such that the air will have free circulation around the motor, escaping through the ducts in the armature and past the commutator end plates to the shaft and thence through the holes around the shaft in the side pieces 298 to the outside.

Figs. 17 and 18 show full sized views of the screws for holding the insulated end plates of the commutators 273 and 274 Figs. 13 and 14. These insulated end plates are intended to provide wide insulated spaces to prevent the electric current flashing off the ends of the commutators. In the enlarged drawing 274 is the commutator and 315 the insulated end plate, 316 is a plug of insulating material screwed into the commutator frame. This plug has a central hole which is squared at the outer end to receive a wrench to turn it. At the inner end the hole is threaded for the countersunk head screw 317, which has a thin flange around the top of the head and a round hole at the center. The end plate 315 has small holes placed to meet the flange of the screw 317 and when the screw is forced up tight the flange where it covers the holes is bent into the holes which may be done with a hammer and punch. The screw may be removed without injury to the plate 315 by means of a circle cutter 319, indicated in dotted lines, which may be held in a bit brace.

Figs. 19 and 20 show a modified form of construction of the center plates 170 and 181 Fig. 10, whereby the positions of the centering screws 178 and 182 may be adjusted to different positions in the plates. In the drawing 320 represents a center plate having a hole in which a round flanged piece 321 is fitted with considerable movement in all directions parallel to the faces of the plate 320. Located in the plate 320, spaced 90 degrees apart around the hole, are the adjusting screws 322 which bear at their ends on the flanged piece 321, so that it may be universally adjusted and held in position. The screws 322 are provided with notched flanges 323 and spring clips 324 with their ends engaging the notches in the adjusting screws are attached to the center plate, thus providing positive locking means in any position of the adjusting screws.

The centering screw 325, with the cone shaped point, corresponding to either of the centering screws 178 or 182 is shown in position in the flanged piece 321.

Fig. 21 shows an enlarged sectional view of the three piece pan 309 referred to with reference to Figs. 13 and 14. 326 is the inner protecting metal sheet attached to the wood pieces 306 by the wood screws 310. This plate is shorter than the others and is notched into the supporting pieces 306. 327 is the insulating sheet and 328 the outer protecting metal sheet. These sheets are of equal width and are notched into the pieces 306 so the outside surface of the sheet 328 is flush with the outside surface of pieces 306. 311 and 312 are the machine screws and nuts respectively for fastening the sheets 327 and 328 to the pieces 306.

Figs 22 and 23 show a preferred form of fastening device for the field coils 284 and 285 with pole pieces 282 and 283, Figs. 13 and 14. The spring strips 329, which are of a length corresponding to the length of the pole pieces, have slits made in them along both edges so that the tongues between the slits will adjust themselves to slight unevenness of the backs of the pole horns and cause the body of the strip to bear all along its length. The field coils and pole pieces are put in place in the magnet frame but the pole pieces are not pulled down tight to the magnet frame, the insulating pieces 329' and the strips 329 are then slipped in from one side and the pole pieces screwed up tight to the magnet frame thus binding the field coils tightly in place.

Fig. 24 shows a method of trueing up the tires of the drive wheels 143, Figs. 9 and 10, without removing them from the locomotive. 330 represents a conventional form of portable lathe having two tool heads, and two driven bevel gears 331, adapted to mesh with the bevel gears 224, each composed of several segments bolted to the inside faces of the driving wheel centers. The bottom edges of the castings 151 rest in ways in the portable lathe and are held immovable by the bolts 332 with clamps 333. The centering screws 178 are screwed up to center the axle and the drive wheel tires may be then accurately trued up quickly.

Figs. 25 and 26 refer to a modified form of insulating the armature mounting on an axle or shaft, in which 334 is the armature and 335 the axle. 336 is a tube of insulating material formed with teeth on the outside to fit lightly into grooves formed in the bore of the armature, and with teeth on the inside to fit tightly into grooves formed on the axle. 337 are discs of insulating material formed with grooves on the inner sides to fit teeth formed at the ends of the armature and with grooves on the outer sides to fit teeth formed in the inner faces of the driving wheels 338 which are pressed tightly on the axles and held firmly against the ends of the armature by the nuts 339.

Figures 27, 28 and 29 illustrate my preferred form of idler gear wheel and adjustable bearings to take the place of the idler gear wheel 252 and roller bearing 254, Figs. 11 and 12. Referring to the Figs. 27, 28 and 29, 340 is the stationary shaft, 341 the idler gear in which are mounted, in grooves formed in the bore of the idler gear, the adjustable bearings 342, having ribs 343 which fit in enlargements in the grooves in the idler gear to keep them from falling out in handling when not in place. The bearings 342 each have a groove at the outer side with wedge faces formed at the bottom in which a wedge block 344 is carried. Each of these wedge blocks has a lug 345 at its outer end formed with a wedge face. Rotatably mounted on the sleeve projection 346 of the idler gear is a ring 347 having wedge faces 348 one of each of which is adapted to engage a wedge face of a lug 345. Gear teeth are formed in a portion of the ring 347 and a pinion 349 on a shaft 350 arranged to mesh with them. The shaft 350 has a bearing at its inner end in the idler gear and at its outer end in a ring 351 secured to the sleeve 346 of the idler gear by bolts 352 with lock washers 353. A portion of the inside of the ring 347 opposite to where the gear teeth are formed has ratchet teeth formed in it, and a ratchet shaft 354 having a pawl 355 and a spring 356 is mounted in the idler gear and ring 351 with the pawl 355 adapted to engage the ratchet teeth. The outer ends of the pinion shaft 350 and the ratchet shaft 354 are squared for a wrench. An axial spring 357 is provided for turning the shaft 350. It is mounted around the shaft with one end attached to the shaft and one end attached to the ring 351. It will be seen that as the bearings 342 wear they can be taken up at intervals by turning the pinion shaft 350 which will cause movement between the wedge faces 345 and 348, pulling the wedge blocks 344 and causing them to press in on the wedge faces of the bearings tightening them, or, the spring 357 will cause a continual pressure to tighten the bearings.

Figs. 30 and 31 further illustrate the air filtering sash 116, in the car body 99, Fig. 7. In Figs. 30 and 31, 358 represents a portion of the car body and 359 the sash, which holds an air filtering material 360 such as cheese cloth. 361 and 362 are woven wire reinforcements and protection for the cheese cloth. 363 are latches to hold the sash in place in the car body and 364 springs for the latches. 365 is a handle to lift the sash out with.

Having described an embodiment of my invention, I claim:

1. In an electric locomotive, an axle, two drive wheels spaced apart, mounted on said axle; an electric motor for driving said axle having a plurality of four or more pole pieces spaced equi-distant around the periphery of the armature in close proximity thereto, located between the drive wheels with its revolving part having an axis parallel to the axis of the axle and in the same vertical plane therewith, and bearings for both said axle and said armature located outside of said drive wheels, and remote from said motor and supported in axle boxes connected by frame work to the motor.

2. In an electric locomotive, an axle, two driving wheels spaced apart, mounted on the axle, journals on the ends of the axle outside of the driving wheels; a motor for driving the axle mounted between the driving wheels with the axis of its revolving driving part parallel to the axis of the axle; axle boxes mounted to encircle the journals, framework connections between the axle boxes and the motor to form a support for the motor and to hold the axle boxes in fixed relation, and bearings mounted in the axle boxes arranged to bear on the top of the journals.

3. In an electric locomotive, an axle, two driving wheels spaced apart mounted on the axle, journals on the ends of the axle outside of the driving wheels; a motor for driving the axle mounted between the driving wheels with the axis of its revolving driving part parallel to the axis of the axle; axle boxes mounted to encircle the journals; frame-work connections between the axle boxes and the motor to form a support for the motor, and to hold the axle boxes in fixed relation; bearings mounted in the axle boxes arranged to bear on the tops of the journals, and bearings mounted in the axle boxes arranged to bear on the bottoms of the journals.

4. In an electric locomotive, an axle, two driving wheels spaced apart mounted on the axle, journals on the ends of the axle outside of the driving wheels; a motor for driving the axle mounted between the driving wheels with the axis of its revolving driving part parallel to the axis of the axle; axle boxes mounted to encircle the journals; framework connections between the axle boxes and the motor to form a support for the motor and to hold the axle boxes in fixed relation; vertically adjustable bearings mounted in the axle boxes arranged to bear on tops of the journals, and vertically adjustable bearings mounted in the axle boxes arranged to bear on the bottoms of the journals.

5. In an electric locomotive, an axle, drive wheels spaced apart mounted on the axle, journals at the ends of the axle outside of the drive wheels; a motor for driving the drive wheels mounted directly above the axle having its axis in a vertical plane with the axis of said axle and positioned between the drive wheels with its shaft parallel to the axle and extending out beyond the drive wheels, gearing between the motor shaft and the axle located outside the drive wheels, journals on the ends of the motor shaft outside of the gearing and means including framework and bearings to support the motor independent of the frame of the vehicle on the axle journals.

6. In an electric locomotive an axle, journals at the ends of the axle, bearings for the journals, gear wheels on the axle between the journals, and drive wheels on the axle between the gear wheels, the inner ends of said bearings extending into the vertical planes of the gears.

7. In an electric locomotive, an axle, journals at the ends of the axle, gear wheels on the axle between the journals, drive wheels on the axle between the gear wheels, a frame work extending from one end of the axle to the other end having bearings to support it on the journals of the axle, a motor mounted above the axle between the drive wheels, said motor including a stationary frame mounted on said framework and a revolving part having a shaft with bearings at its ends supported on said framework, and gearing on said shaft between its bearings connected to the gear wheels on the axle.

8. In an electric locomotive, a truck frame having vertical guideways, an axle having axle boxes at its ends located in the vertical guideways of the truck frame for vertical movement and mounted on drive wheels located between the axle boxes, a motor located between the drive wheels above the axle with its bearing boxes outside the drive wheels and located in the vertical guideways of the truck frame for vertical movement, framework connecting the axle boxes and motor bearing boxes and forming a support for the motor, and vertical resilient means between the said framework and the truck frame.

9. In an electric locomotive, a truck frame having vertical guideways, an axle having axle boxes at its ends located in the vertical guideways of the truck frame for vertical movement and mounted on drive wheels located between the axle boxes, a motor located between the drive wheels above the axle with its bearing boxes outside the drive wheels and located in the vertical guideways of the truck frame for vertical movement, framework connecting the axle boxes and motor bearing boxes and forming a support for the motor, and vertical resilient means between the said framework and the truck frame including springs located at the outer sides of the truck frame.

10. In an electric locomotive, a truck frame having vertical guideways, an axle having axle boxes at its ends located in the vertical guideways of the truck frame for vertical movement and mounted on drive wheels located between the axle boxes, a motor located between the drive wheels above the axle with its bearing boxes outside the drive wheels and located in the vertical guideways of the truck frame for vertical movement, framework connecting the axle boxes and motor bearing boxes and forming a support for the motor, and vertical resilient means between the said framework and the truck frame including leaf springs with their centers held between the axle boxes and the motor bearing boxes.

11. In an electric locomotive, an axle, two drive wheels spaced-apart mounted on said axle, an electric motor for driving said axle located between the driving wheels with its revolving parts having an axis in the same vertical plane with the axis of said axle, and bearings for said axle, having bearing boxes arranged to support said motor.

12. In an electric locomotive, an axle, two driving wheels spaced apart mounted on said axle, journals on the ends of the axle outside of the driving wheels, a motor for driving the axle, axle boxes mounted to encircle the journals, and frame work connections between the axle boxes and the motor to form a support for said motor and to hold the revolving parts thereof in a position with the axis of said revolving parts and the axis of said axle in one and the same vertical plane.

13. In an electric locomotive, a plurality of truck units each comprising an axle having wheels mounted thereon, journals at each end of said axle, journal boxes for supporting said axle, a motor positioned directly above said axle and having the revolving parts thereof supported by said axle boxes, frame work connecting the axle boxes of adjacent trucks, and means on said frame work for connecting successive trucks to form larger units of trucks.

14. In an electric locomotive, a plurality of truck units comprising independently motor driven axles having wheels mounted thereon, axle boxes for said axles and for supporting said motors, gears mounted on each end of the rotating part of said motor and meshing with gears mounted on each end of said axle, and means for detachably securing similar truck units together.

15. In an electric locomotive, a plurality of individual motor driven truck units each comprising an axle having spaced apart wheels thereon, said motor being positioned directly above said axle and having gear driving connection therewith, and detachable connecting means on each of said units, said connecting means comprising a ball head pin and socket joint.

16. In an electric locomotive, the combination with an axle, of a pair of spaced-apart drive wheels thereon, an electric driving motor mounted between said wheels in fixed relation to said axle, driving connections between said motor and said axle, bearings for the armature of said motor, means for supporting said bearings outside of the planes of said wheels, and remote from the space between said wheels, and for supporting said motor in fixed relation to said axle, a truck frame, means for resiliently supporting said truck frame on the first-named supporting means, and upright guides in said truck frame, supporting means associated with said first-named supporting means for confining the latter to upright positions and preventing the same from tilting while permitting free up and down movement of said truck frame relatively to said axle.

EDMUND C. MORGAN.